United States Patent [19]

Callahan et al.

[11] 3,882,159

[45] May 6, 1975

[54] REACTIVATION OF MOLYBDENUM CONTAINING OXIDATION CATALYSTS IN FLUID BED REACTORS

[75] Inventors: James L. Callahan, Bedford Heights; Wilfrid G. Shaw; Arthur F. Miller, both of Lyndhurst, all of Ohio

[73] Assignee: Standard Oil Company, Cleveland, Ohio

[22] Filed: Aug. 20, 1973

[21] Appl. No.: 390,175

[52] U.S. Cl. ....... 260/465.3; 260/533 N; 260/604 R; 260/680 E
[51] Int. Cl. ........................................... C07c 121/02
[58] Field of Search ................................. 260/465.3

[56] References Cited
UNITED STATES PATENTS

| | | |
|---|---|---|
| 3,280,167 | 10/1966 | Schwarzer et al. ............. 260/465.3 |
| 3,472,892 | 10/1969 | Callahan et al. ................. 260/465.3 |
| 3,518,284 | 6/1970 | Foster .......................... 260/465.3 X |
| 3,629,148 | 12/1971 | Dominik et al. ............. 260/465.3 X |
| 3,639,103 | 2/1972 | Sheely ............................. 260/465.3 |
| 3,644,472 | 2/1972 | Paleologo et al. ............... 260/465.3 |
| 3,658,877 | 4/1972 | Callahan et al. ................. 260/465.3 |

*Primary Examiner*—Joseph P. Brust
*Attorney, Agent, or Firm*—Herbert D. Knudsen

[57] ABSTRACT

Molybdenum-containing oxidation catalysts used in a fluid-bed reactor have been discovered to become partially deactivated through loss of molybdenum from the catalyst. These partially deactivated catalysts are regenerated in situ by the addition of fluid-bed particles consisting of an essentially inert support material containing molybdenum.

5 Claims, No Drawings

REACTIVATION OF MOLYBDENUM CONTAINING OXIDATION CATALYSTS IN FLUID BED REACTORS

BACKGROUND OF THE INVENTION

It has been discovered that certain molybdenum-containing catalysts become deactivated during the course of their use in ammoxidation, oxidation or oxidative dehydrogenation reactions in fluid-bed reactors. Of course there are a number of possible reasons for catalyst deactivation. Central to the present invention is the discovery that one deactivation path is the loss of molybdenum during the course of the reaction.

Once this problem is known, however, the solution is certainly not readily discernable. Traditionally, one would be required to take the degenerated catalyst out of the reaction zone for reactivation, or the deactivated catalyst would have to be replaced with fresh catalyst.

The reactions of the present invention and the molybdenum-containing catalysts used are known. See for example U.S. Pat. No. 3,642,930; U.S. Pat. No. 3,471,556 and Ser. No. 85,722 filed Oct. 30, 1970.

SUMMARY OF THE INVENTION

It has now been discovered in the process for the ammoxidation, oxidation or oxidative dehydrogenation of a hydrocarbon at a temperature of about 200° to about 600°C. in a fluid-bed reactor using a fluid-bed oxidation catalyst containing molybdenum wherein said oxidation catalyst has become partially deactivated by loss of molybdenum, the improvement comprising regenerating the oxidation catalyst by contacting the oxidation catalyst with fluid-bed particles consisting of an essentially inert support containing molybdenum. This regeneration technique can be used to produce a revitalized catalyst without disruption of the reaction.

The central aspect of the present invention is the use of a fluid-bed particle of an essentially inert support and at least molybdenum to regenerate molybdenum-containing oxidation catalysts.

The fluid-bed particle contacted with the deactivated catalyst may contain substantially any form of molybdenum. The particle could contain molybdenum metal, molybdenum oxide, molybdenum nitrate, molybdenum halide and the like, with the use of molybdenum oxide being preferred because of the compatability of the oxide with the oxidation catalyst.

The amount of molybdenum in the particle is not critical and may vary widely. There must, however, be at least some of the essentially inert support incorporated into the particle. Preferred particles contain more than about 50% by weight of the molybdenum component.

In addition to the molybdenum component, the fluid-bed particle added to regenerate the catalyst could contain other elements, such as iron, bismuth or tellurium, that are useful in the regeneration of the catalyst, but the use of catalysts consisting essentially of the inert support and the molybdenum or molybdenum compound are preferred.

The essentially inert support may be selected from any of the large number of support materials readily available. These inert supports give low conversions (less than about 25%) of the starting materials. Representative examples of preferred support materials are silica, alumina, silica-alumina, zirconia, boron-phosphate, silicon carbide or titania. Silica is the support material that is especially desirable for the regeneration reaction.

The fluid-bed particle used in the regeneration may be prepared in a number of different ways. A preferred preparation involves the spray drying of an aqueous slurry containing finely divided support material and finely divided molybdenum metal or molybdenum compound. In a similar manner, a solution of a molybdenum compound could be combined with a finely divided support material, and the resulting suspension could be dried and ground to the desired fluid-bed catalyst size.

In the preparation, it appears that the molybdenum should be placed on the support material for the best results. Thus, although it is possible to carry out the invention with a physical mixture of the support and molybdenum, such as those obtained by comminuting a dry mixture of silica and molybdenum oxide, it is preferred to use a preparative technique that places the molybdenum on the support material. Such preferred preparations are described broadly above and more fully in the Specific Embodiments.

The regenerative process of the present invention takes place by contacting the fluid-bed particle of an essentially inert support and molybdenum with the spent catalyst under conditions that rejuvenate the catalyst. Preferred are the use of conditions that are substantially the same as the conditions of the reaction, with the in situ regeneration of the catalyst conducted during the course of the reaction being especially preferred because of the minimal disruption of the catalytic process.

More specifically, preferred regenerations take place at an elevated temperature of about 200° to about 600°C. It has also been found that the regeneration is facilitated by the presence of molecular oxygen, usually added as air. Steam also facilitates the transfer. Use of a combination of air and steam is especially preferred.

The exact mechanism by which the regeneration of the catalyst takes place in the present invention is not known. It is known, however, that at least some of the molybdenum in the fluid-bed particle is somehow transferred to and incorporated into the lattice structure of the deactivated oxidation catalyst in such a manner that a deficiency of molybdenum in the used catalyst is overcome, and the activity of the catalyst is restored.

The other aspects of this invention are not critical. As noted above, the regeneration process of the present invention can be applied to catalysts that contain molybdenum. Although the regeneration is especially useful for catalysts used in ammoxidation, oxidation and oxidative dehydrogenation reactions, this technique could be applied to a wide variety of other reactions using molybdenum-containing catalysts.

One interesting embodiment of the invention involves the use of support materials that have some degree of physical instability after the molybdenum has been transferred to the oxidation catalyst. When the concentration of molybdenum falls to a low level, the support material disintegrates and is carried out in the reactor effluent. Thus, the catalyst inventory is not adversely affected by inert support material remaining after the regeneration.

SPECIFIC EMBODIMENTS

EXAMPLE 1

Regeneration in presence of steam and air.

A fresh catalyst of 50% $K_{0.1}Ni_{2.5}Co_{4.5}Fe_3BiP_{0.5}Mo_{12}O_x$ (where $x$ is the number of oxygens to satisfy the valence requirements of the other elements present) and 50% $SiO_2$ in fluid-bed form was used in the ammoxidation of propylene to produce acrylonitrile. The reaction was carried out in a 1½ inch inside diameter fluid-bed reactor using a feed of propylene/ammonia/air of 1/1.1/9.3 at a temperature of 435°C. The percent per pass conversion (moles of acrylonitrile produced × 100/mole of propylene fed) was 71%.

The catalyst was used continuously in the ammoxidation of propylene to acrylonitrile under strenuous conditions. Under the conditions described above for the ammoxidation of propylene, the percent per pass conversion was 62–63% after deactivation. A sample of the catalyst was removed from the reactor and analyzed. It was determined that the catalyst was deficient in molybdenum.

Fluid-bed particles containing 85% $MoO_3$ and 15% $SiO_2$ were prepared by forming an aqueous slurry of finely dispersed molybdenum trioxide and silica sol at 25°C. The mixture was ball milled for 17 hours and then spray dried. The dried material was heated 2 hours at 285°C. and then 2 hours at 450°C. A portion of this material having a particle size distribution substantially the same as that of the fresh catalyst was chosen for the regeneration.

The fluid-bed reactor described above was charged 550 grams of the deactivated catalyst. To this reactor charge was added 35 grams of the molybdenum-containing fluid-bed particles prepared above.

The reactor was operated at a temperature of about 480°C. for 65 hours using a feed of air/steam of 2/1 at an apparent contact time of four seconds.

At the termination of the regeneration, the ammoxidation of propylene to obtain acrylonitrile was resumed under the test conditions described above. The percent per pass conversion was 70–73% as compared to 62–63% for the deactivated catalyst. Thus, the contact with molybdenum-containig particles according to the present invention restored the activity of the catalyst.

EXAMPLE 2

Regeneration under reactor conditions.

In the same manner as described for Example 1, the regeneration was conducted during the course of the reaction. The molybdenum-containing fluid particles were charged to the deactivated catalyst, and the reactor was operated at 440°C. using a propylene/ammonia/air feed of 1/1.1/9.5 and an apparent contact time of 7 seconds. After a period of 48 hours, the percent per pass conversion was greater than 70%. Thus, the activity of the catalyst was restored.

In the same manner as described above, other catalysts containing molybdenum and useful in ammoxidation reactions are regenerated. Also in the same manner, catalysts containing molybdenum and useful in oxidation reactions and oxidative dehydrogenation reactions are regenerated according to the invention.

We claim:

1. In the process for the ammoxidation of propylene at a temperature of about 200° to about 600°C. in a fluid-bed reactor using a fluid-bed ammoxidation catalyst containing molybdenum to produce acrylonitrile wherein said ammoxidation catalyst has become partially deactivated by loss of molybdenum, the improvement comprising regenerating the ammoxidation catalyst at reaction temperatures in the presence of air, steam or mixture thereof by contacting the ammoxidation catalyst with fluid-bed particles consisting of (a) an essentially inert support giving less than 25% conversion of the propylene and (b) molybdenum oxide.

2. The process of claim 1 wherein the essentially inert support is selected from the group consisting of silica, alumina, silica-aluminum, zirconia, boron phosphate, silicon carbide or titania.

3. The process of claim 2 wherein the essentially inert support is silica.

4. The process of claim 1 wherein the regeneration takes place under conditions that are substantially the same as the conditions of the process.

5. The process of claim 1 wherein the regeneration is conducted during the course of the reaction.

* * * * *